United States Patent [19]

Freyn et al.

[11] 4,311,120
[45] Jan. 19, 1982

[54] COUNTERBALANCE FOR AN INTERNAL COMBUSTION ENGINE

[75] Inventors: Fritz Freyn; Josef Greier, both of Graz, Austria

[73] Assignee: Hans List, Graz, Austria

[21] Appl. No.: 60,990

[22] Filed: Jul. 26, 1979

[30] Foreign Application Priority Data

Aug. 29, 1978 [AT] Austria .................. 6277/78

[51] Int. Cl.³ ............................................. F02B 75/06
[52] U.S. Cl. ................................ 123/192 B; 474/112;
74/604
[58] Field of Search .......... 123/192 R, 192 B, 195 A;
74/603, 604; 474/112

[56] References Cited

U.S. PATENT DOCUMENTS

| | | | |
|---|---|---|---|
| 2,914,963 | 12/1959 | Scherenberg | 74/604 |
| 3,830,212 | 8/1974 | Seino et al. | 123/192 B |
| 3,903,995 | 9/1975 | Irgens | 123/192 B |
| 4,028,963 | 6/1977 | Nakamura et al. | 123/192 B |
| 4,222,280 | 9/1980 | Stewart | 474/112 |

FOREIGN PATENT DOCUMENTS

| | | |
|---|---|---|
| 969154 | 5/1958 | Fed. Rep. of Germany . |
| 1920569 | 11/1970 | Fed. Rep. of Germany ... 123/192 B |
| 1931444 | 12/1970 | Fed. Rep. of Germany . |
| 2542738 | 4/1976 | Fed. Rep. of Germany . |

Primary Examiner—Craig R. Feinberg
Assistant Examiner—W. R. Wolfe
Attorney, Agent, or Firm—Watson, Cole, Grindle & Watson

[57] ABSTRACT

As a counterbalance for an internal combustion engine a counterbalanceweight (7) driven by a crankshaft (2) of the engine by means of a non slipping drive is pivoted on a shaft (6) and combined with the driven part (8) of the non slipping drive. As a stretching or tensioning arrangement for the transmission means (9) of the non slipping drive, the shaft (6) supporting the counterbalanceweight (7) is provided with an eccentrically arranged journal pin (10) pivoted and lockable in the housing (1) of the engine.

4 Claims, 3 Drawing Figures

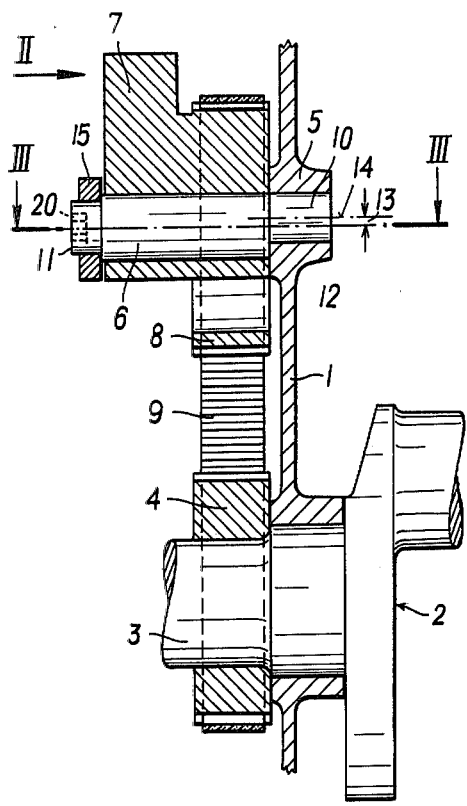
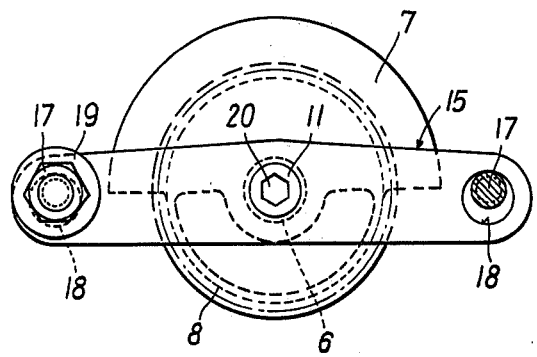
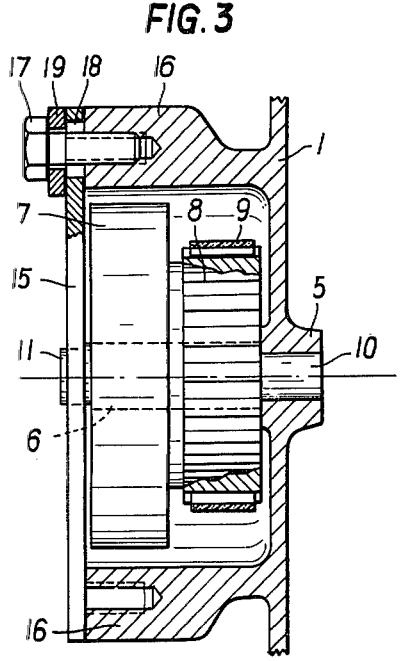

COUNTERBALANCE FOR AN INTERNAL COMBUSTION ENGINE

BACKGROUND OF THE INVENTION

The invention relates to a counterbalance for an internal combustion engine comprising a counterbalanceweight driven by using non slipping transmission means e.g. tooth-belts or chains, tensioning means being provided for the transmission means.

DESCRIPTION OF THE PRIOR ART

Such a counterbalance having a drive and a transmission of the rotation formed by a tooth-belt is known and e.g. described by the German laid open print No. 2 542 738. To make the mounting of the counterbalance easier and to compensate the tolerances of the distance between the drive shaft and the driven shaft a tooth-belt is used being longer than necessary, whereby the toothbelt is kept under a desired tension by means of a tension roller. This is necessary to achieve a positive transmission of the rotation even if a chain were used instead of the tooth-belt. It is difficult to arrange the tension roller especially if there is only a small distance between the driving shaft and the driven shaft, and because of further technical problems.

SUMMARY OF THE INVENTION

It is an object of the invention to arrange the counterbalance for an internal combustion engine in such a way, that a tension roller for tensioning a tooth-belt drive or a chain drive is superfluous but nevertheless the possibility of tensioning the tooth-belt or chain remains.

According to the invention the counterbalanceweight driven by non slipping drive and transmission means, such as a tooth-belt drive or a chain drive, is pivoted on a shaft and combined with the driven part of the drive and transmission means, e.g. a belt-pulley or a sprocket, to an integral part. And, as tensioning means for the drive and transmission means, the shaft bearing the counterbalanceweight is provided with an eccentrically arranged journal pin pivoted in the housing of the internal combustion engine, and means are provided to lock the shaft. Due to the integration of the counterbalanceweight into the belt, or chain-drive, it is possible to omit a separate tension roller. To make the mounting of the tooth-belt or chain easier, the distance between the driving crankshaft and the driven counterbalanceweight may be decreased by turning the eccentrically journalled shaft. After mounting the tooth-belt or chain the shaft may be adjusted to obtain the desired tension of the tooth-belt or chain. The small displacement of the counterbalanceweight relative to the crankshaft caused by the stretching action is negligible with regard to the grade of the counterbalance because due to the very small displacement only an unimportant momentum is caused acting in the longitudinal or transverse direction.

The combination of the driven belt-pulley or the sprocket with the pivoted counterbalanceweight to form a unit is known per se and is e.g. disclosed in German laid open print No. 1 931 444 and in German patent No. 964 154. However, in case of these known arrangements the counterbalanceweight is driven by toothed wheel gearing, whereby the driven gear wheel is coaxially superimposed on the counterbalancemass pivoted on an axle. This arrangement causes a relatively significant technical effort and is a further source of engine-noise. According to an especially advantageous embodiment of the invention the shaft bearing the counterbalanceweight is journaled at its both ends, resulting not only in an advantageous distribution of load on the shaft but also the possibility of designing the displacement means of the tensioning arrangement in a more simple manner.

It is further advantageous if one end of the shaft is provided with a concentric journal pin and the other end with an eccentric journal pin whereby the bearing carrying the concentric journal pin has to be displaceably arranged to permit a displacement of the shaft during the tensioning action. In this regard it is especially advantageous to arrange the displaceable bearing in a bracket which is displaceably attached to the internal combustion engine.

The mounting of the shaft using one concentric and one eccentric journal pin prevents an undesired release of the shaft after a stretching or tensioning action due to the tension of the belt or the chain, although the displaceable arrangement of the bearing for the concentric journal pin permits a displacement of the shaft of the counterbalanceweight during the stretching action of the tooth-belt or chain. The arrangement of the bearing in a bracket being displaceably attached to the internal combustion engine is a very simple and advantageous embodiment of the invention.

According to a further feature of the invention locking of the shaft in an adjusted position is done by clamping the displaceable bearing or the bracket. Therefore fixing of the counterbalanceweight in every position is achieveable in a very simple manner and the tooth-belt or chain may therefore be optimally stretched.

DESCRIPTION OF THE DRAWINGS

The invention will be described in more detail in conjunction with the accompanying drawings, showing an embodiment of the invention.

FIG. 1 shows a part section of an internal combustion engine provided with a counterbalance according to the invention.

FIG. 2 shows a view of the counterbalanceweight in the direction of the arrow II of FIG. 1 and FIG. 3 shows a part section taken substantially along line III—III of FIG. 1.

DESCRIPTION OF THE PREFERRED EMBODIMENT

A partly shown crankshaft 2 is journaled in the wall of a housing 1 of an internal combustion engine (not otherwise shown in detail). A pulley 4 for a tooth-belt is attached to the stub shaft 3 of crankshaft 2. Above the crankshaft housing 1 is provided with a lug 5 used to pivot a shaft 6. A counterbalanceweight 7 is pivoted on shaft 6 together with a further pulley 8 for the tooth belt. The counterbalanceweight 7 and pulley 8 are preformed in one piece. The propulsion of the counterbalanceweight 7 occurs by the crankshaft 2 and the toothbelt pulley 4 and is transmitted by means of a tooth-belt 9.

The shaft 6 bearing the counterbalanceweight 7 is provided with an eccentric journal pin 10 at its end which is privoted within the housing 1, and is provided with a concentric journal pin 11 at its other end.

The shaft 6 of the counterbalanceweight 7 is therefore eccentrically pivoted within the housing 1 with regard to its axis of rotation. Such eccentricity is indicated in FIG. 1 by the distance 13 between the axis of rotation 12 and the axis 14 of the eccentric journal pin 10.

The concentric journal pin 11 of the shaft 6 is fixedly journaled within a bracket 15 which is detachably attached to projections 16 (FIG. 3) of the housing 1 by means of bolts 17. The bracket 15 is provided with bores 18 at both of its ends, whereby the diameter of the bores is greater than the shanks of bolts 17 passing therethrough. A shim 19 is arranged between the head of the bolt 17 and the bracket 15 (FIG. 3).

The concentric journal pin 11 is provided with a hexagonal recess 20. Therefore it is possible to pivot shaft 6 about axis 14, after loosening the bolts 17, by means of a suitable hollow screw spanner, causing a displacement of the counterbalanceweight 7 together with the tooth-belt pulley 8 to stretch or tension the tooth-belt 9 according to the eccentric bearing of the shaft 6 within the lug 5. Due to the bores 18 the bracket 15 can follow the displacement of the shaft 6. After adjusting the shaft 6 the bolts 17 may be tightened firmly to clamp the bracket 15 and hold it in position, whereby an alteration of the adjustment of the shaft 6 or of the tension of the tooth-belt 9 is prevented. In this regard the arrangement of an eccentric and a concentric journal pin is of special advantage, because a self reliant resetting of the shaft 6 due to the tension of the tooth-belt is prevented by the arrangement without further locking means.

We claim:

1. A counterbalance for an internal combustion engine having a housing and a crankshaft extending therefrom, comprising, a counterbalance weight, a non-slipping drive and transmission means acting between said crankshaft and said weight, said means including a driven part, said weight thereby being driven by said crankshaft via said means, a shaft mounted on said housing, said driven part of said means being combined with said weight, said combined weight and driven part being pivotally mounted on said shaft for rotation about the axis thereof by said crankshaft, one end of said shaft having a journal pin arranged eccentrically to said shaft axis and being pivotally mounted on said housing, the other end of said shaft having a journal pin arranged concentrically to said shaft axis, said shaft axis being displaceable relative to the crankshaft axis upon pivotal movement of said shaft about the axis of said eccentrically arranged journal pin for adjustably tensioning said non-slipping drive and transmission means upon said pivotal movement, and a bearing element affixed to said concentrically arranged pin and being displaceable relative to said housing to permit the displacement of said shaft during the tensioning of said transmission means.

2. The counterbalance according to claim 1, wherein clamping means are provided for locking said bearing element in an adjustable position relative to said housing.

3. The counterbalance according to claim 1, wherein said bearing element comprises a bracket adjustably attached to said housing.

4. The counterbalance according to claim 3, wherein clamping means are provided for locking said bracket in an adjusted position relative to said housing.

* * * * *